Figure 1:
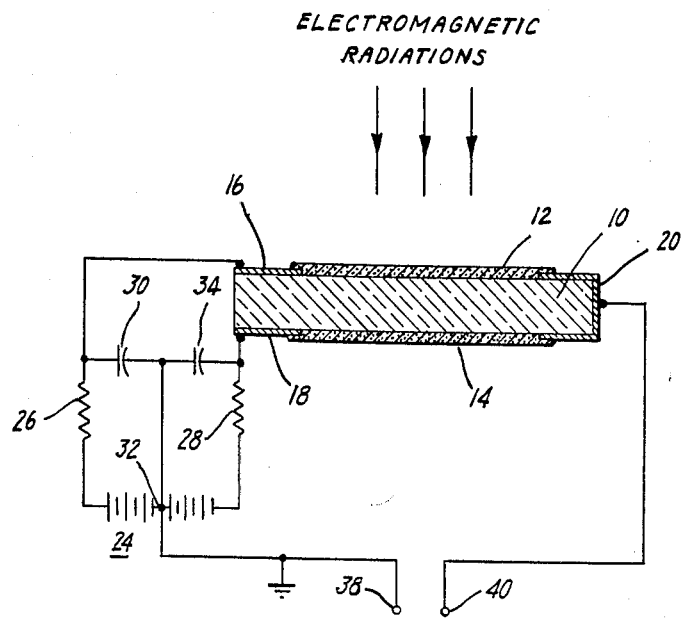

Nov. 22, 1960    L. W. CARTWRIGHT ET AL    2,961,542
RADIATION-DETECTING DEVICE AND SYSTEM
Filed Nov. 2, 1956

INVENTORS
LEONARD W. CARTWRIGHT
SHIRLEY C. BLOWERS
BY
ATTORNEY

United States Patent Office 2,961,542
Patented Nov. 22, 1960

2,961,542
RADIATION-DETECTING DEVICE AND SYSTEM

Leonard W. Cartwright, Philadelphia, Pa., and Shirley C. Blowers, Waterville, N.Y., assignors to Philco Corporation, Philadelphia, Pa., a corporation of Pennsylvania Filed Nov. 2, 1956, Ser. No. 620,149

11 Claims. (Cl. 250—83.3)

The present invention relates to devices for the detection of electromagnetic radiations, and especially infrared radiations.

Devices for the detection of electromagnetic radiations have found a number of important applications, including the reception of infra-red energy in communication systems and the detection of object-reflected infra-red radiations in object-locating systems. In one common form of such devices, there is employed a photo-conductive element, of a material such as lead sulphide for example, which is characterized by a decrease in electrical resistance upon impingement by electromagnetic energy of preselected wavelength. When a fixed voltage is applied across such a photo-conductive element, increases in the intensity of the infra-red-radiation produce increases in the electrical current through the device.

In many cases, and particularly in applications in which it is desired to detect extremely weak radiations, it is important to minimize any variations in current through the photo-conductive element which may be produced by influences other than the radiations which are to be detected. One such influence comprises variations in the temperature of the element, which tend to alter the resistance of the element and hence the current through it. Microphonic noise produced by vibration of the device constitutes a further source of such undesired current changes, and radiations having wavelengths outside the band to be detected but within the band to which the device is at least partly responsive are also capable of producing spurious current changes in the photo-conductive element.

Accordingly it is an object of our invention to provide improved apparatus for the detection of electromagnetic radiations.

Another object is to provide such apparatus which is less susceptible to microphonically-induced noise than prior art apparatus.

Still another object is to provide improved photo-responsive apparatus in which the output connections and leads therefrom are less susceptible to interfering noise signals than are arrangements of the prior art.

It is a further object to provide such apparatus in which the deleterious effects of temperature variations and/or undesired radiations are substantially reduced.

In accordance with the invention, the above objectives are achieved by the provision of an electromagnetic radiation detector comprising an integral base member having a photoconductive element on one of its surfaces and another element of similar nature upon an opposed surface thereof. Preferably these surfaces are plane-parallel and relatively closely spaced compared to the transverse dimensions of the opposed elements, while the elements comprise substantially identical layers directly opposite each other. In operation the device is arranged so that the radiations to be detected selectively irradiate one of the photo-conductive layers, as is preferably accomplished by utilizing a base member substantially opaque to the radiations to be detected, and exposing a first of the layers to these radiations while shielding the second layer from them. Current is then passed through each photo-conductive element, thereby to derive electrical signals indicative of variations in the resistances of the elements. These signals are then combined subtractively in such manner that, in the absence of irradiation of either cell, the resultant output signal is substantially zero. However, when the irradiation of the un-shielded photoconductive layer increases, the resultant output signal departs from zero and thereby provides an indication of the impingent energy.

We have found that microphonically-induced noise is substantially less in the resultant output signal of the apparatus of the invention than in prior art arrangements, apparently because microphonics produce similarly-phased variations in the resistances of the photo-conductive layers and corresponding signal variations which tend to cancel each other when subtractively combined. Furthermore, this same subtractive combination reduces variations due to temperature changes which would otherwise be prominent in the output signal. In addition, since the resultant output signal is substantially zero for zero incident radiation, the leads from the device operate at substantially zero D.-C. current for small values of radiation, and therefore exhibit a substantially reduced tendency to pick up noise signals from external sources. The combined result of these several improvements is to provide infra-red detection apparatus which is less sensitive than prior art arrangements to temperature variations, microphonics and externally-induced noise.

While the base member separating the photo-conductive layers may be substantially opaque for all wavelengths of the radiations impinging it, in accordance with the invention in another aspect the base member is preferably of a material which selectively attenuates radiations having the wavelengths to be detected, but is transmissive of radiations of other wavelengths which may also impinge the radiation detector. As a result, both photo-conductive elements are impinged by the undesired radiations and respond thereto to produce corresponding in-phase signals which tend to cancel each other at the output terminals of the system; however, since the desired signals affect only the unshielded photo-conductive layer, such signals appear in the output without substantial diminution.

In one particularly simple and effective form of the invention, two photo-conductive layers separated by a thin base member of glass are connected in series with a common source of potential difference, and a tap connection is provided at a point on the potential source having a potential equal to the potential existing at the interconnection of the two photo-conductive layers in the absence of the radiations to be detected. One layer is exposed to the radiations to be detected, and output signals indicative of these radiations are taken from between the interconnection of the two photo-conductive layers and the tap connection on the potential source.

Figure 2:
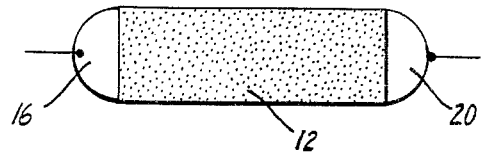

Other objects and features of the invention will become apparent from a consideration of the following detailed description, taken in connection with the accompanying drawings, in which:

Figure 1 is a representation showing in sectional elevation a device constructed in accordance with the invention, and also showing schematically the nature of an electrical circuit connected thereto further in accordance with the invention; and Figure 2 is a plan view of the device shown in Figure 1.

Referring now more particularly to the form of the invention shown in the drawings, in which the various elements thereof are not necessarily to scale and in which corresponding numerals are utilized to designate corresponding parts in the two figures, the thin base member 10, which may be of glass or of some other optically-selective materials as described hereinafter, is provided with a pair of similar photo-conductive layers 12 and 14 on opposite sides thereof, as shown. Layer 12 is of a material which changes its resistance substantially upon impingement by the radiations to be detected, and in various applications may be of lead sulfide, lead telluride or gold-doped germanium for example. Layer 14 may be of the same material, and of the same configuration and dimensions, as layer 12, but it will be understood that the advantages of the invention will be realized at least in part when layer 14 differs in some degree from layer 12 so long as its resistance changes in the same sense as that of layer 12 in response to vibration of the unit and preferably also in response to temperature changes. Also provided are an electrically-conductive connection 16 to layer 12, a similar connection 18 to layer 14 and a direct conductive connection 20 between layers 12 and 14. Each of connections 16, 18 and 20 may comprise layers of a metal such as gold, evaporated onto base member 10 prior to application thereto of the photo-conductive layers 12 and 14.

Considering now the circuit configuration shown in Figure 1, a potential source 24 is utilized to supply a voltage across the series combination of layers 12 and 14 and resistors 26 and 28. Also provided are a first capacitor 30 connected between connection 16 and a tap 32 on source 24, and a second capacitor 34 disposed between connection 20 and the same tap 32. Output terminals 38 and 40 are connected to tap 32 and connection 20, respectively.

Since layers 12 and 14 are in series across the source 24, tap 32 may be adjusted to a position in which its potential is the same as that of connection 20 in the absence of applied radiations. When so adjusted, the voltage at terminals 38 and 40, which equals the difference between the potential at connection 20 and that at tap 32, is also zero in the absence of radiations. Designating the resistance of resistor 26 as $R_1$, that of layer 12 as $R_2$, that of layer 14 as $R_3$ and that of resistor 28 as $R_4$, and designating the voltage between the positive terminal of source 24 and tap 32 as $V_1$ and that between tap 32 and the negative terminal of source 24 as $V_2$, the condition for zero output voltage is as follows:

$$V_1/V_2 = (R_1+R_2)/(R_3+R_4)$$

For the particularly simple case in which $R_1=R_3$ and $R_2=R_4$, $V_1$ equals $V_2$ and tap 32 is then a center-tap on source 24. However other combinations of resistances and supply voltages conforming to the above relation may also be used where appropriate.

In operation, when layer 12 is exposed to radiations to be detected, its resistance decreases substantially, while that of layer 14 retains substantially its original resistance value. As a result, the potential at output terminal 40 becomes negative with respect to that at output terminal 38 to an extent which increases as the strength of the radiations increases, thereby providing the desired indications.

Resistors 26 and 28 and capacitors 30 and 34 are not critical in value, and indeed are not necessary in all applications of the invention. One of their principal functions is to filter out noise or hum from the supply lines to the photo-conductive device, and for this purpose their values may be chosen on the basis of well-known filter theory. In addition, where the strength of the radiations to be detected is modulated at a predetermined frequency as in many communication and object-detection systems, the capacitors 30 and 34 are also preferably sufficiently large to act as bypasses for the modulation frequency, so that substantially the full modulation voltage is developed across the photo-conductive layer 12. The voltage of source 24 is also relatively non-critical, being selected in a manner well-known in the art to provide the desired bias current in the particular photo-conductive layers employed in the particular application.

From the foregoing it will be apparent that the output terminals 38 and 40 are at substantially the same D.-C. potential when no infra-red radiations are being detected, or when the infra-red radiations are very weak. As a result, the leads to and from the terminals 38 and 40 are substantially less susceptible to picking up induced undesired noise signals which would interfere with weak indications of low-level infra-red radiations. In addition, and particularly in embodiments in which photo-conductive layers 12 and 14 are substantially identical, the output signal at terminals 38 and 40 will remain at substantially zero potential in the absence of infra-red radiations, despite large temperature changes, since the layers 12 and 14 will be substantially equally affected by such temperature variations, and the changes in voltage produced thereby will be equal in the two photo-resistive layers and will therefore cancel each other at the output terminals 38 and 40.

In addition we found that, when the device shown is vibrated strongly, the microphonically-induced noise generated in the device is substantially less at output terminals 38 and 40 than that produced in prior art arrangements. While the details of the mechanism of this reduction are not entirely understood, it appears that a substantial portion of the microphonic noise is produced in similar phase in the two photo-conductive elements 12 and 14, so that the subtractive combination of the signals from these two elements results in substantial cancellation of such noise components.

While it is not intended thereby to limit the scope of the invention, the following examples of particular forms and values of the elements employed in one specific embodiment of the invention are presented in the interest of complete definiteness. In one embodiment the support member 10 may be of glass about one millimeter in thickness, the photo-conductive layers 12 and 14 may be identical lead sulphide layers each 10 mm. by 10 mm. in size, and the connections 16, 18 and 20 may be of gold evaporated upon member 10. Source 24 may provide a total supply potential of 100 volts, 50 volts on either side of center-tap 32. Resistors 26 and 28 may each have a resistance of 470,000 ohms, and capacitors 30 and 34 may each be of 0.1 microfarad capacity. The resultant device is a sensitive detector of infra-red radiations, highly stable in the presence of substantial temperature variations, which, when vibrated at 2 G's over a frequency range from 200 to 2000 cycles per second, exhibits maximum noise levels of less than about 80 microvolts as compared to 200 to 700 microvolts obtained with conventional devices vibrated under similar conditions.

In another aspect of the invention, the member 10 is preferably of a material which is selected to provide substantial transmission of electromagnetic radiations outside of the wavelength band to be detected, and substantial absorption for radiations in the desired band. Glass is a suitable material for this purpose when constituted in accordance with techniques known in the art so as to possess the desired discrimination against radiations of the wavelength to be detected. For example, glass containing FeO may be used to provide substantial attenuation for infra-red radiations, while passing shorter-wavelength radiations more freely. Utilizing such material for base member 10, the photo-conductive member 14 is irradiated by at least some of any extraneous electromagnetic radiations which may impinge layer 12 and pass through layer 12 and body 10, but is shielded from radiations of those wavelengths which it is desired to detect. As a result, there are cancelled from the output signal between terminals 38 and 40 those indications which might otherwise be produced in response to the undesired electromagnetic radiations.

While the invention has been described with particular reference to specific embodiments thereof, it will be understood that it is susceptible of embodiment in a wide variety of forms differing from the particular forms shown, without departing from the scope of the invention as defined by the appended claims.

We claim:

1. An infra-red radiation detector cell comprising an integral, rigid, supporting member of high electrical resistivity and high opacity to infra-red radiations, at least a region of which member is of uniform thickness, a first layer of photoconductive material adhering to a first surface of said region, a second layer of photoconductive material adhering to a second surface of said region opposite said first surface, said first and second layers being symmetrically disposed and held upon said supporting member so as to provide predominantly in-phase microphonic effects in said first and second layers in response to vibration of said supporting member, and means providing conductive connections to said first and second layers.

2. A device in accordance with claim 1, comprising also a layer of material of low electrical resistivity extending from said first layer to said second layer and adhering to said supporting member and to each of said layers.

3. A system for the detection of infra-red radiations comprising an integral, rigid, supporting member of high electrical resistivity and high opacity to infra-red radiations, at least a region of which member is of uniform thickness, a first layer of photoconductive material adhering to a first surface of said region, a second layer of photoconductive material adhering to a second surface of said region opposite said first surface, said first and second layers being symmetrically disposed and held upon said supporting member so as to provide predominantly in-phase microphonic effects in said first and second layers in response to vibration of said supporting member, means for passing currents through said layers to derive electrical indications of variations in the resistances thereof, and means for subtractively combining said currents to cancel similar variations therein while retaining indications of differences in the resistances of said layers due to differential exposure to infra-red radiations.

4. A system in accordance with claim 3, in which said last-named means comprises a third layer of material of low electrical resistivity extending between said first and said second layers and adhering to said supporting member and to each of said first and second layers.

5. An infra-red radiation detector cell comprising an integral, rigid, supporting member of glass of high electrical resistivity and high opacity to infra-red radiations, at least a region of which member is of uniform thickness, a first layer of photoconductive lead sulfide material adhering to a first surface of said region, a second layer of photoconductive lead sulfide material adhering to a second surface of said region opposite said first surface, said first and second layers being substantially identical in composition and form and disposed in alignment with each other on said opposite surfaces, and means providing conductive connections to said first and second layers.

6. An infra-red radiation detector cell comprising an integral, rigid, supporting member of high electrical resistivity and high opacity to infra-red radiations, said supporting member having substantially transmissivity for radiations in the visible spectrum, at least a region of said member being of uniform thickness, a first layer of photoconductive material adhering to a first surface of said region, a second layer of photoconductive material adhering to a second surface of said region opposite said first surface, and means providing conductive connections to said first and second layers.

7. An infra-red radiation detector cell comprising an integral, rigid, supporting member of high electrical resistivity and high opacity to infra-red radiations, said member being of glass containing a minor amount of the substance having the chemical formula FeO, at least a region of said member being of uniform thickness, a first layer of photoconductive material adhering to a first surface of said region, a second layer of photoconductive material adhering to a second surface of said region opposite said first surface, and means providing conductive connections to said first and second layers.

8. A system for the detection of infra-red radiations comprising an integral, rigid, supporting member of glass of high electrical resistivity and high opacity to infra-red radiations, at least a region of which member is of uniform thickness, a first layer of photoconductive lead sulfide material adhering to a first surface of said region, a second layer of photoconductive lead sulfide material adhering to a second surface of said region opposite said first surface, said first and second layers being substantially identical in form and composition and disposed in alignment with each other on said opposite surfaces, means for passing currents through said layers to derive electrical indications of variations in the resistances thereof, and means for subtractively combining said currents to cancel similar variations therein while retaining indications of differences in the resistances of said layers due to differential exposure to infra-red radiations.

9. A system for the detection of infra-red radiations comprising an integral, rigid, supporting member of high electrical resistivity having high opacity to infra-red radiations and substantial transmissivity for radiations in the visible spectrum, at least a region of said member being of uniform thickness, a first layer of photoconductive material adhering to a first surface of said region, a second layer of photoconductive material adhering to a second surface of said region opposite said first surface, means for passing currents through said layers to derive electrical indications of variations in the resistances thereof, and means for subtractively combining said currents to cancel similar variations therein while retaining indications of differences in the resistances of said layers due to differential exposure to infra-red radiations.

10. A system for the detection of infra-red radiations comprising an integral, rigid, supporting member of high electrical resistivity and high opacity to infra-red radiations, said supporting member being of glass containing a minor amount of the substance having the chemical formula FeO, at least a region of said member being of uniform thickness, a first layer of photoconductive material adhering to a first surface of said region, a second layer of photoconductive material adhering to a second surface of said region opposite said first surface, means for passing currents through said layers to derive electrical indications of variations in the resistances thereof, and means for subtractively combining said currents to cancel similar variations therein while retaining indications of differences in the resistances of said layers due to differential exposure to infra-red radiations.

11. An infra-red radiation detector cell comprising an integral, rigid, supporting member of high electrical resistivity and high opacity to infra-red radiations, at least a region of which member is of uniform thickness, a first layer of photoconductive material adhering to a first surface of said region, a second layer of photoconductive material adhering to a second surface of said region opposite said first region, said first and second layers being provided with substantially the same freedom for motion at their exterior surfaces, and means providing conductive connections to said first and second layers.

References Cited in the file of this patent

UNITED STATES PATENTS

| | | |
|---|---|---|
| 2,553,420 | McFee | May 15, 1951 |
| 2,742,550 | Jenness | Apr. 17, 1956 |

FOREIGN PATENTS

| | | |
|---|---|---|
| 702,268 | France | Apr. 3, 1931 |